United States Patent
Hekstra et al.

(10) Patent No.: US 8,576,245 B2
(45) Date of Patent: Nov. 5, 2013

(54) COLOUR CONVERSION FOR A MULTY-PRIMARY DISPLAY

(75) Inventors: Gerben Johan Hekstra, Eindhoven (NL); Oleg Belik, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 973 days.

(21) Appl. No.: 12/441,544

(22) PCT Filed: Sep. 17, 2007

(86) PCT No.: PCT/IB2007/053728
§ 371 (c)(1),
(2), (4) Date: Mar. 17, 2009

(87) PCT Pub. No.: WO2008/035264
PCT Pub. Date: Mar. 27, 2008

(65) Prior Publication Data
US 2010/0060659 A1    Mar. 11, 2010

(30) Foreign Application Priority Data

Sep. 20, 2006 (EP) ..................................... 06120937

(51) Int. Cl.
*G09G 5/02* (2006.01)
(52) U.S. Cl.
USPC ....................................................... 345/600

(58) Field of Classification Search
USPC .................................................. 345/589–610
See application file for complete search history.

(56) References Cited

U.S. PATENT DOCUMENTS

| | | | |
|---|---|---|---|
| 6,185,004 B1 * | 2/2001 | Lin et al. .......................... | 358/1.9 |
| 6,633,302 B1 * | 10/2003 | Ohsawa et al. ................ | 345/604 |
| 6,992,683 B2 * | 1/2006 | Shin et al. ....................... | 345/589 |
| 7,019,868 B2 * | 3/2006 | Chang et al. .................... | 358/2.1 |
| 2007/0188711 A1 | 8/2007 | Sharp et al. | |

FOREIGN PATENT DOCUMENTS

| WO | WO2004032523 | 4/2004 |
|---|---|---|
| WO | WO2005101366 | 10/2005 |

OTHER PUBLICATIONS

Jak et al, "Spectrum Sequential Liquid Crystal Display", 2005 SID International Symposium, Boston, MA, May 24-27, 2005, SID International Symposium, San Jose, CA, US, pp. 1120-1123.

* cited by examiner

*Primary Examiner* — Xiao M. Wu
*Assistant Examiner* — Charles Tseng

(57) ABSTRACT

A multi-primary conversion method is disclosed for converting an input vector defining a color of an input pixel in a Linear color space into a drive vector having n components for driving "n" display primaries of a display color space. The drive vector comprises m sub-drive vectors for driving m groups of the display primaries.

12 Claims, 5 Drawing Sheets

COLOUR CONVERSION FOR A MULTY-PRIMARY DISPLAY

FIELD OF THE INVENTION

The invention relates to a multi-primary conversion method, a system for multi-primary conversion, a display device comprising the system for multi-primary conversion, a camera comprising the system for multi-primary conversion, and a computer program product.

BACKGROUND OF THE INVENTION

WO 2004/032523 A1 discloses a color display device which is provided with a plurality of picture elements. The display device has more than the usual three display primaries to be able to display a wider gamut of colors. Two selectable light sources have different predetermined radiance spectra. Color filters in combination with the selectable light sources are able to produce respective first and second primary colors on the display device. A controller selects alternatively one of the selectable light sources and provides a portion of the picture elements with image information corresponding to the respective primary colors obtainable with the selected light source. The primary colors of the display device can be selected in a time sequential and space sequential way which enables a reduction of the color break up.

In an embodiment, this spectral sequential display drives two sub-frames for each input frame defined by input pixel values. During one of the sub-frames the light source with a first spectrum produces light while the other light source is inactive, and during the other one of the sub-frames the light source with a second spectrum produces light while the light source with the first spectrum is off. There are n different color filters associated with n sub-pixels per pixel of the display device. The light produced by a particular pixel depends on which light source is active, which color filter is associated with the particular pixel and which drive value is supplied to the particular pixel. The drive value may control the transmission of the pixel.

This prior art shows in FIG. 17 a color gamut for a color display device which uses two sub-fields per field, wherein two light sources are present which are active sequentially, each one during one of the two sub-fields, and wherein sub-pixels are illuminated per subfield. In the luminance-chrominance representation of FIG. 17, the primaries Pa, Pb represent the colors of the two sub-pixels illuminated by the first light source during the first subfield, and the primaries Pc, Pd represent the colors of the other two sub-pixels illuminated by the second light source during the second subfield. This gamut is further referred to as the full gamut.

FIG. 18 of the prior art shows a sub-gamut which can be achieved with equal luminance and equal chrominance in both spectra defined by on the one hand the primaries Pa and Pb and on the other hand the primaries Pc and Pd. The colors in this sub-gamut, which is further referred to as the equal luminance and equal chrominance sub-gamut, can be produced in the two subfields with equal luminance and equal chrominance.

FIG. 19 of the prior art shows a sub-gamut which can be achieved with equal luminance in both subfields. This sub-gamut, which is further referred to as the equal luminance sub-gamut, comprises the equal luminance and equal chrominance sub-gamut.

WO 2004/032523 A1 discloses an approach to reduce color break up in a sequential display. If the input color of an input pixel is within the equal luminance and equal chrominance sub-gamut, the drive values of the sub-pixels during the two successive subfields are selected to obtain an equal luminance and an equal chrominance during these two subfields. If the input color of an input pixel is outside the equal luminance and equal chrominance sub-gamut but within the equal luminance sub-gamut, the drive values of the sub-pixels during the two successive subfields are selected to obtain an equal luminance during these two subfields. Although this prior art provides a high performance, it does not disclose how to efficiently determine the drive values of the sub-pixels during the subfields.

SUMMARY OF THE INVENTION

It is an object of the invention to provide a multi-primary conversion with a low computational effort.

A first aspect of the invention provides a multi-primary conversion method as claimed in claim 1. A second aspect of the invention provides a system for multi-primary conversion as claimed in claim 10. A third aspect of the invention provides a display device as claimed in claim 11. A fourth aspect of the invention provides a computer program product as claimed in claim 12. Advantageous embodiments are defined in the dependent claims.

A multi-primary conversion method in accordance with the first aspect of the invention converts an input vector which defines a color of an input pixel in a linear color space into a drive vector for example for driving a display device. If the linear color space is the CIE-XYZ space, the input vector comprises three values, one for X, one for Y, and one for Z. It is not essential to the present invention that the linear color space is an XYZ space, a representation in any linear color space can be used, for example a luminance/chromaticity space. If the input vector is not defined in a linear color space it first has to be transformed into a linear color space.

The drive vector comprises n components for driving n display primaries of the display device. The n display primaries are defined in a display color space. Or said differently, the n display primaries form the n primary colors which are used in the display device to display the image. The display color space may be an N-drive signals space (similar to RGB space in case of a three primary display). The drive vector comprises m sub-drive vectors to drive m groups of display primaries. The groups all may have the same amount of display primaries. As in WO 2004/032523 A1, the groups of display primaries may be driven with light sources having different spectra. The m groups of display primaries define an n-primary display gamut, which is the full gamut. The groups of primaries may be the colors associated with sub-pixels of a display device such as for example a LCD display device, a DMD display device or any other pixilated display. Usually, these groups of sub-pixels, which define the groups of primaries, are spatially displaced. The different groups of sub-pixels may be illuminated at the same time with different light sources. This provides a wider gamut display with increased spatial uniformity and/or decreased pixel pattern visibility. Alternatively, the different groups of sub-pixels may be illuminated in different subfields of a field period with light sources having different spectra to provide a wider gamut display wherein flicker and/or color breakup are minimized.

In the linear color space a position of the input vector with respect to boundaries of three gamuts defined by the display primaries transformed to the linear color space are determined. The three gamuts are: the full gamut which comprises all colors reproducible with the m groups of the sub-drive vectors, an equal luminance sub-gamut which comprises all colors which are reproducible with each one of the m groups of the sub-drive vectors with equal luminance, and an equal luminance and equal chrominance sub-gamut which comprises all colors reproducible with each one of the m groups of sub-drive vectors with an equal luminance and an equal chrominance.

Two boundary vectors are selected on the boundaries of the three gamuts in the linear color space such that the input pixel vector can be interpolated by the selected boundary vectors. Usually, the boundary vectors will be selected nearest to the input pixel vector such that the input color vector is in-between the selected boundary vectors. Once the boundary vectors are selected in the linear color space, the interpolation factor is determined from the position of the input pixel vector with respect to the selected two boundary vectors. The interpolation factor indicates how the pixel vector is interpolated from the two boundary vectors. For example, if the interpolation is linear, the pixel vector is obtained by a weighted sum of the boundary vectors, and the interpolation factor indicates the weights. If, for example, the boundary vectors and the input vector all are positioned on the same straight line, the interpolation factor may be indicated by a fraction. Although more complex, it is possible to use more than two boundary vectors to interpolate the pixel vector. Consequently, the interpolation factor should indicate how the pixel vector is interpolated from the boundary vectors in the linear color space.

In the display color space, the drive vector which represents the color of the input pixel is interpolated from the two or more boundary vectors in the display color space and the interpolation factor. The two or more boundary vectors in the display color space correspond to the two or more selected boundary vectors in the linear color space. For example, if the interpolation factor is determined in the linear color space by using the input vector and two boundary vectors in the linear color space, the two corresponding boundary vectors in the display color space may be obtained by the transforming the two boundary vectors in the linear color space to the display color space. This transformation as such is well known.

The algorithm requires a relatively low computationally effort because the position of the input pixel vector with respect to the boundaries is simple to determine. For example, in a luminance/chrominance space the boundaries are made up out of straight lines and only the equations of these straight lines have to be known. Consequently, it is relatively easy to determine the interpolation factor. Further, because the display drive vector is determined from boundary display vectors which end on the boundaries it is relatively easy to perform the interpolation. The algorithm optimizes the performance if the boundary vectors on the boundaries nearest to the input vector are selected to determine the interpolation factor. This selection of the boundary vectors leads to a minimal flicker, color breakup, or pixel pattern visibility. As will become clear from the description of the embodiments, many alternatives exist to perform the algorithm.

In an embodiment the determining in the linear color space of a position of the input vector with respect to the boundaries of three gamuts defined in the linear color space comprises transforming the display primaries in the display color space to the linear color space to obtain transformed display primaries. This transformation from, for example, the RGB to XYZ color space is as such well known. The boundaries of the full gamut, the equal luminance sub-gamut, and the equal luminance and equal chrominance sub-gamut are constructed from the transformed display primaries, thus in the linear color space in which also the input vector is defined. The boundary vectors used for interpolation are selected on the boundaries in the linear color space, and the interpolation factor is determined.

The interpolating in the display color space of the drive vector first transforms the selected two boundary vectors in the linear color space to two display boundary vectors in the display color space. It has to be noted that this transformation is linear and thus a one to one relation exists between the vectors in the linear color space and in the display color space. Further, this linearity enables to determine the drive vector in the display color space by interpolating the display boundary vectors in the display color space by using the same interpolation factor as defined in the linear color space.

Thus, to conclude, this embodiment of the algorithm determines in the linear color space where the input vector lies which respect to the three boundaries and selects at least two boundary vectors on these boundaries. Preferably, the boundary vectors are selected on the boundaries nearest to the input vector such that the input color vector is in-between the selected boundary vectors. Then, the algorithm calculates an interpolation factor from the position of the input pixel vector and the selected boundary vectors. And finally, the algorithm calculates the drive values for the groups of primaries by interpolation from the transformed selected boundary vectors in the linear color space, thus from the corresponding boundary vectors in the display space using the interpolation factor determined in the linear color space.

In an embodiment, the determining in the linear color space of the position of the input vector with respect to the boundaries of the three gamuts is in fact partly performed in the display color space. In a pre-stored table for each input vector in the linear color space, one display boundary vector in the display color space on each one of three display gamut boundaries is stored. The display boundary vectors are selected to be able to interpolate the input vector from the corresponding boundary vectors in the linear color space. It is actually not required to store the display boundary vectors for each input vector. For example, the display boundary vectors may only be stored for a particular amount of input vectors. For other input vectors the display boundary vectors are interpolated from the stored display boundary vectors. In fact, instead of the boundaries of the three gamuts in the linear color space, the corresponding three display gamut boundaries in the display color space are used.

The selection of the two boundary vectors on the boundaries of the two gamuts nearest to the input pixel vector may be performed by transforming the three display boundary vectors in the display color space to three boundary vectors in the linear color space. The boundary luminances of these three boundary vectors in the linear color space is calculated. The boundary luminances in the linear color space are compared with an input luminance of the input vector in the linear color space. The two display boundary vectors of the three display boundary vectors are selected which have the boundary luminance nearest to the input luminance such that the input color vector is in-between the selected boundary vectors. The interpolation factor is determined from the position of the input pixel vector with respect to the two boundary vectors in the linear color space with the two boundary luminances nearest to the input luminance. This approach has the advantage that no real time transformations from the display color primaries in the display color space to the linear color space are required. Further, the determination of the nearest boundary vectors in the linear color space and in the display color space is quite simple because the position of the boundary vectors in the display color space is already pre-selected and stored, for example in a look up table. Consequently, only the luminances in the linear color space need to be determined to be able to select the two nearest boundary vectors to be used for the determination of the interpolation factor. It has to be noted that the determination of the interpolation factor in the linear color space and the subsequent interpolation in the display color space becomes very simple if a linear interpolation is used and the input vector and the boundary vectors end on a same straight line.

In an embodiment, for an input vector within the equal luminance and equal chrominance sub-gamut, the two boundary vectors are both selected on the boundary of the equal luminance and equal chrominance sub-gamut. Consequently, to completely prevent flicker, this optimal selection of the boundary vectors provides an equal luminance and an equal chrominance for input vectors which can be displayed in the different sub-fields with the same luminance and the same chrominance.

In an embodiment, for an input pixel vector within the equal luminance sub-gamut but outside the equal luminance and equal chrominance sub-gamut, one of the two boundary vectors is selected on the boundary of the equal luminance sub-gamut and the other one of the two boundary vectors is selected on the boundary of the equal luminance and equal chrominance sub-gamut. Again, by this selection of the boundary vectors on boundaries closest to the input vector and such that the input vector can be interpolated, any artifacts are minimized because the boundary vectors which are used during the two sub-frames have equal luminance.

In an embodiment, for an input pixel vector outside the equal luminance sub-gamut and outside the equal luminance and equal chrominance sub-gamut, one of the two boundary vectors is selected on the boundary of the full gamut, and one of the two boundary vectors is selected on the boundary of the equal luminance sub-gamut.

In an embodiment, the input vector is converted into the drive vector for m sub-frames of a frame. Each one of the m groups of p display primaries is allocated to a corresponding one of the m sub-frames. The display primaries of the m groups of display primaries correspond with sub-pixels of the display device.

In an embodiment the interpolation is a linear interpolation. In such a linear interpolation it suffices to have two display drive vectors which end at the nearest boundaries and which together with the to be interpolated value of the display drive vector corresponding to the input drive vector end on a same straight line. Now, the determination of the interpolation factor and the interpolation itself are very simple. In an embodiment wherein this line runs through the origin of the color space, for example the luminance/chrominance space, the algorithm becomes especially simple. It has to be noted that the display drive vectors comprise sub-drive vectors, one for each one of the m groups of display primaries. These sub-drive vectors are the actually used drive values for the display primaries of the each one of the m groups. The total color displayed by pixel composed out of the m groups of sub-pixels is represented by the display drive vector.

BRIEF DESCRIPTION OF THE DRAWINGS

These and other aspects of the invention are apparent from and will be elucidated with reference to the embodiments described hereinafter.

In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF THE EMBODIMENTS

Figure 1:
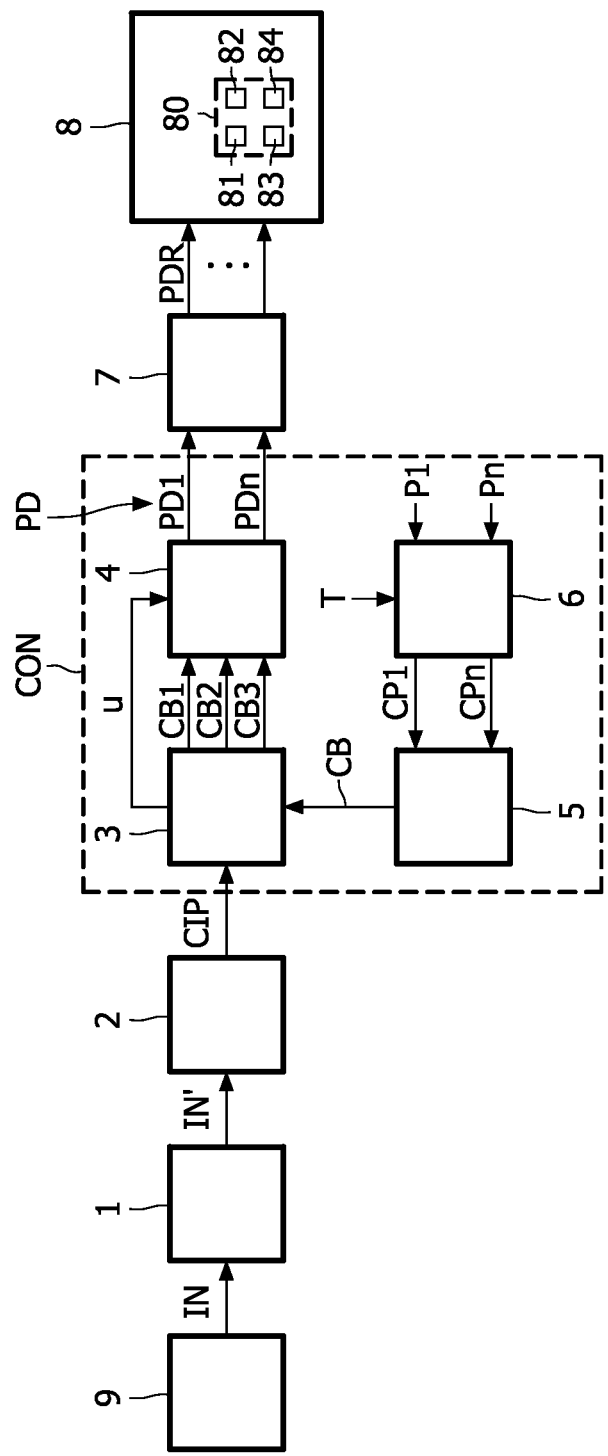
FIG. 1 shows a block diagram of a display apparatus with a circuit for performing a multi-primary conversion in accordance with an embodiment of the invention.

FIG. 1 shows a block diagram of a display apparatus with circuit for performing a multi-primary conversion in accordance with an embodiment of the invention. The circuit CON which performs the multi-primary conversion comprises a boundary vector determining circuit 3, an interpolating circuit 4, a transforming circuit 6, and a boundary constructing circuit 5. The display apparatus comprises an optional transforming circuit 2, a drive circuit 7, and a display device 8.

The source gamma operation is performed by the optional block 1 which receives an input signal IN, for example from a camera 9 and supplies a signal IN' which has been gamma pre-corrected. If the input signal is gamma pre-corrected, or is not defined in a linear color space due to another reason, the optional transforming block 2 transforms the signal IN' from the non-linear color space to a linear color space to obtain the input signal CIP for the multi-primary converter CON. If the signal inputted to the multi-primary converter CON is already defined in a linear color space, the transforming block 2 is not required. For example, the linear color space may be the XYZ space or an LC (luminance/chromaticity) space.

The transforming circuit 6 transforms the primaries P1 to Pn in the display color space into the primaries CP1 to CPn in the linear color space by using the transform matrix T. Alternatively, usually, the display primaries are already defined as the primaries CP1 . . . CPn, thus there is no need to apply a transform. In other words, the matrix T already consists of CP1 . . . CPn). The boundary constructing circuit 5 receives the primaries CP1 to CPn and constructs the boundaries CB of the full gamut FG, the equal luminance gamut ELG, and the equal luminance and equal chrominance gamut ELCG (see FIG. 5).

The boundary vector determining circuit 3 receives the input signal CIP in the linear color space, and the boundaries CB of the full gamut FG, the equal luminance gamut ELG, and the equal luminance and equal chrominance gamut ELCG. The boundary vector determining circuit 3 defines the three boundary vectors CB1, CB2, CB3 which end on the three boundaries of the full gamut FG, the equal luminance gamut ELG, and the equal luminance and equal chrominance gamut ELCG (see FIG. 5) and which are selected to be able to interpolate the input vector CIP. In fact it suffices to take two of the boundary vectors CB1, CB2, CB3 to be able to interpolate the input vector CIP. Preferably, the two boundary vectors nearest to the input vector IP are selected such that the input vector occurs in-between the two boundary vectors. The boundary vector determining circuit 3 further supplies the interpolation factor u which indicates how the input vector CIP is interpolated from the two or three boundary vectors CB1, CB2, CB3.

The interpolating circuit 4 receives all or two of the boundary vectors CB1, CB2, CB3 and the interpolation factor u. The boundary vectors CB1, CB2, CB3 are transformed from the linear color space to the boundary vectors PB1, PB2, PB3 (see FIG. 6) in display color space. The drive vector PD corresponding to the input vector CIP is obtained by interpolating the two or three boundary vectors PB1, PB2, PB3 with the interpolation factor u. Thus, if in the linear space the interpolation factor u is determined from the input vector CIP and two of the three boundary vectors CB1, CB2, CB3, in the display space the drive vector PD is interpolated from the two corresponding ones of the three boundary vectors PB1, PB2, PB3, by using the same interpolation factor u. If only two of boundary vectors PB1, PB2, PB3, only the two use need to be transformed from the linear color space.

The drive circuit 7 receives and processes the drive vector PD to obtain the drive values PDR suitable to drive the display 8. For example, the drive circuit may amplify the drive vector levels to levels appropriate for the display 8, and/or may convert a voltage to a current. The display 8 comprises pixels 80 which are formed by a set of sub-pixels. In the example shown, the pixel 80 comprises four sub-pixels 81 to 84. In a multi-primary system, the pixels should contain more than three sub-pixels. The sub-pixels 81 to 84 have an individually controllable transmission, reflection or polarization.

It has to be noted that if the sub-pixels 81 to 84 are driven in different sub-fields, the drive vector PD and the drive values PDR are assembled from sub-vectors and values per sub-field. For example the field may be divided in two sub-fields. In one of the sub-fields, the sub-pixels 81 and 82 are illuminated and only these sub-pixels are driven, and during the other sub-field, the sub-pixels 83 and 84 are illuminated and only these sub-pixels are driven. In this example, the color coordinates of the sub-pixels 81 and 82 form the primaries P1 and P2 of the primaries P1 to Pn (in this example n=4) and define the color gamut which can be displayed during the corresponding sub-field. The color coordinates of the sub-pixels 83 and 84 form the primaries P3 and P4 and define the color gamut which can be displayed during the corresponding sub-field. Alternatively, the four sub-pixels 81 to 84 may be driven during each sub-field, resulting in eight primaries in total.

Figure 2:
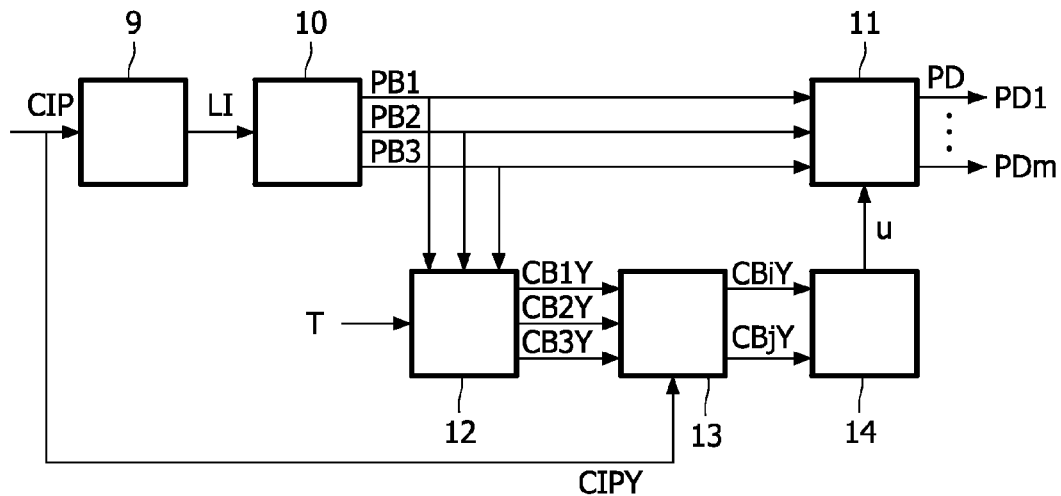
FIG. 2 shows a block diagram of a circuit for performing a multi-primary conversion in accordance with another embodiment of the invention.

FIG. 2 shows a block diagram of a circuit for performing a multi-primary conversion in accordance with another embodiment of the invention. The indexing circuit 9 receives the input vector CIP in the linear color space to supply an index LI to the storage medium 10. The storage medium 10 may be a look up table which supplies the three boundary vectors PB1, PB2, PB3 in the display color space corresponding to the index LI. Thus, the look table 10 is filled with three points on the boundaries in the display color space of the full gamut FG, the equal luminance gamut ELG, and the equal luminance and equal chrominance gamut ELCG, respectively. These stored points can directly be used for the interpolation in the display color space. An advantage is that these boundary vectors PB1, PB2, PB3 can be determined on before hand such that an optimal interpolation is obtained.

The calculation circuit 12 transforms the boundary vectors PB1, PB2, PB3 related to the actual input vector CIP, which defines the input color, to the boundary vectors CB1, CB2, CB3 in the linear color space. For example, the calculation circuit 12 calculates the luminance CB1Y, CB2Y, CB3Y of each of these boundary vectors CB1, CB2, CB3. More in general, the calculation circuit 12 may calculate other linear parameters, like the X-attribute in the CIE-XYZ space.

The comparator 13 compares the luminances CB1Y, CB2Y, CB3Y with the luminance CIPY of the input vector CIP and selects the two luminances CBiY and CBjY nearest to the luminance CIPY of the input vector CIP. One of the nearest luminances is smaller than the luminance CIPY, the other one of the nearest luminances is larger than the luminance CIPY.

The interpolator factor determining circuit 14 receives the two luminances CBiY, CBjY to determine the interpolation factor u for the luminance CIPY. Thus, the interpolation factor u determines how the luminance CIPY is interpolated from the two luminances CBiY, CBjY. It has to be noted that in the linear color space the interpolation factor u can be calculated by using the luminances Y, or the coordinates in X or Z plane. Alternatively, the complete vectors CBi, CBj may be used.

The interpolator 11 receives the boundary vectors PB1, PB2, PB3 in the display color space corresponding to the actual input vector CIP and the interpolation factor u to interpolate the drive vector PD from the two boundary vectors and the same interpolation as used for determining the interpolation factor u. The determination of the interpolation factor u and the interpolation become particular simple of a linear interpolation is applied.

Figure 3:
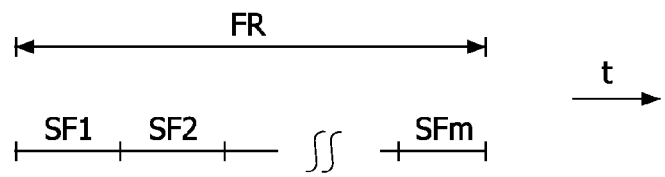
FIG. 3 shows one field and its sub-fields.

FIG. 3 shows one field and its sub-fields. By way of example, the field FR comprises M sub-fields SF1, SF2, ..., SFm. In the now following, the multi-primary conversion will be explained for a system wherein the field FR comprises two sub-fields SF1 and SF2. And wherein during each sub-field two display color primaries define the color which can be displayed during the sub-field. But, more in general, in the m (m>1) sub-fields p (p>1) color primaries are present. Usually, the number p of color primaries is the same for all sub-fields, now the multiplication of m and p provides the n primaries of the display which define the colors which can be displayed in by the display, in the display color space.

Figure 4:
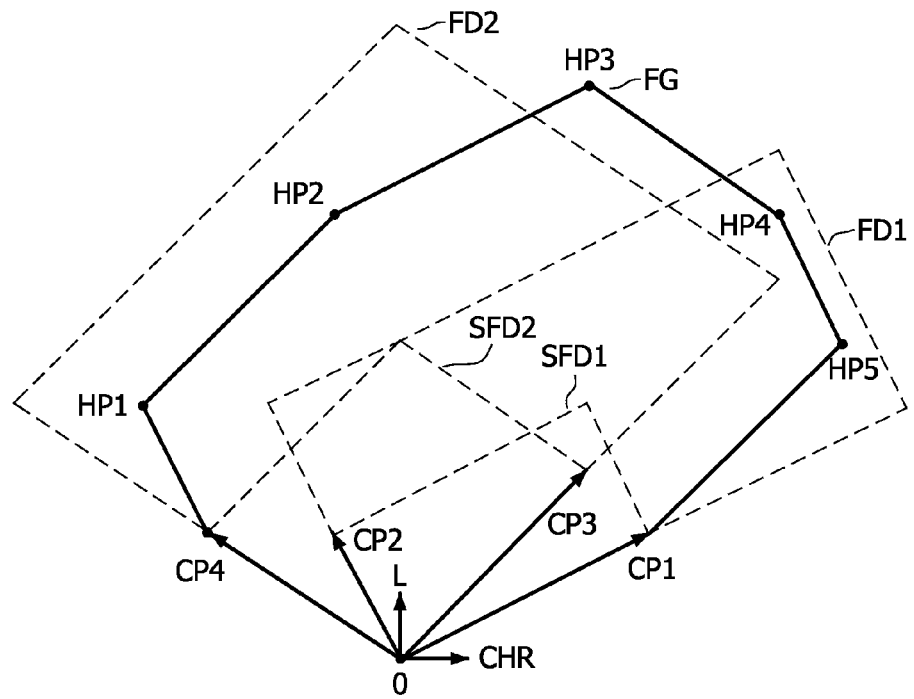
FIG. 4 shows the full gamut obtained in a multi-primary conversion based on a system driven with two sub-fields wherein two sets two display primaries are driven.

FIG. 4 shows the full gamut obtained in a multi-primary conversion based on a system driven with two sub-fields wherein two sets two display primaries are driven. The origin O of the luminance L, chromaticity CHR linear color space is the start point of all vectors mentioned. The primaries CP1 and CP2 are the display primaries P1 and P2, respectively, which have been transformed from the display color space to the linear color space, and the primaries CP3 and CP4 are the display primaries P3 and P4, respectively, which have been transformed from the display color space to the linear color space.

Thus the color which can be displayed during the first sub-field SF1 are defined by the dashed rectangle SFD1. This set of displayable colors is also referred to as the color gamut of the primaries CP1 and CP2. The rectangle indicated by SFD2 defines the color gamut of the primaries CP3 and CP4. The full gamut FD is the gamut which can be displayed during a field FR. The full gamut FD is obtained by vectorial addition of a vector in the gamut SFD1 and a vector in the gamut SFD2. For example, the vertex HP1 is the addition of the vectors CP4 and CP2, the vertex HP2 is the addition of the vectors CP3, CP4 and CP2, the vertex HP3 is the addition of all the vectors CP1 to CP4, the vertex HP4 is the addition of the vectors CP1, CP2, and CP3, and the vertex HP5 is the addition of the vectors CP1 and CP3.

The rectangle indicated by FD1 would be the gamut of the primaries CP1 and CP2 if used during a full field FR instead of the half field period duration of the subfield SF1. The rectangle indicated by FD2 would be the gamut of the primaries CP3 and CP4 if used during a full field FR instead of the half field period duration of the subfield SF2.

Figure 5:
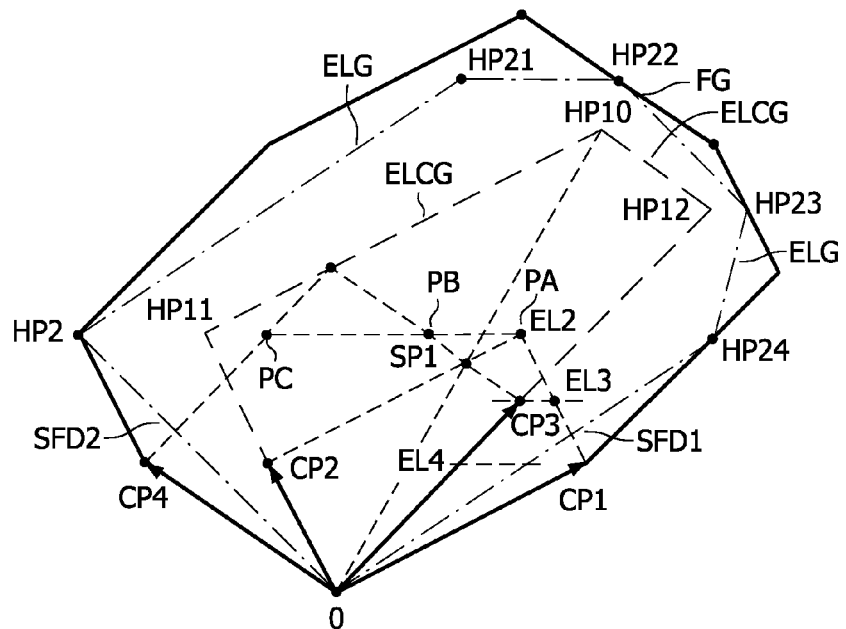
FIG. 5 shows the full gamut, the equal luminance gamut, and the equal luminance and equal chromaticity gamut of the multi-primary conversion elucidated with respect to FIG. 4.

FIG. 5 shows the full gamut, the equal luminance gamut, and the equal luminance and equal chromaticity gamut of the multi-primary conversion elucidated with respect to FIG. 4. The primaries CP1 to CP4 and their gamuts SFD1 and SFD2, and the full gamut FG are identical to those of FIG. 4.

The equal luminance and equal chromaticity sub-gamut ELCG has the vertices O, HP11, HP10, and HP12 and comprises all the colors which can be displayed during a field FR and which are composed of colors (vectors) which have the same luminance and the same chromaticity during the sub-fields SF1 and SF2. For example, the color SP1 which lies on the border of the gamut defined by the primaries CP1 and CP2 and thus can be displayed during the subfield SF1, can also be displayed by the primaries CP3 and CP4 during the subfield SF2. The resulting color during the field which comprises these subfields SF1 an SF2 is the color of the vertex HP10.

The equal luminance sub-gamut ELG has the vertices O, HP2, HP21, HP22, HP23, and HP24 and comprises all the colors which can be displayed during a field FR and which are composed of colors which have the same luminance but not the same chromaticity during the subfields SF1 and SF2 of the field FR. For example, the color of vertex HP24 is obtained when during the sub-field SF1 the primary CP1 is fully driven while the primary CP2 is not driven, and during the sub-field SF2 the primaries CP3 and CP4 are driven such that the vector EL4 is the result. It has to be noted that the vectors CP1 and EL4 have the same luminance L but different chromaticities CHR, and the vectorial sub thereof is the vector ending in the vertex HP24. In the same manner, the equal luminance vectors PA during the sub-field SF1 and PC during the sub-field SF2 give rise to the vector ending in vertex HP21. The equal luminance vectors PA and PB define the vertex HP22.

Figure 6:
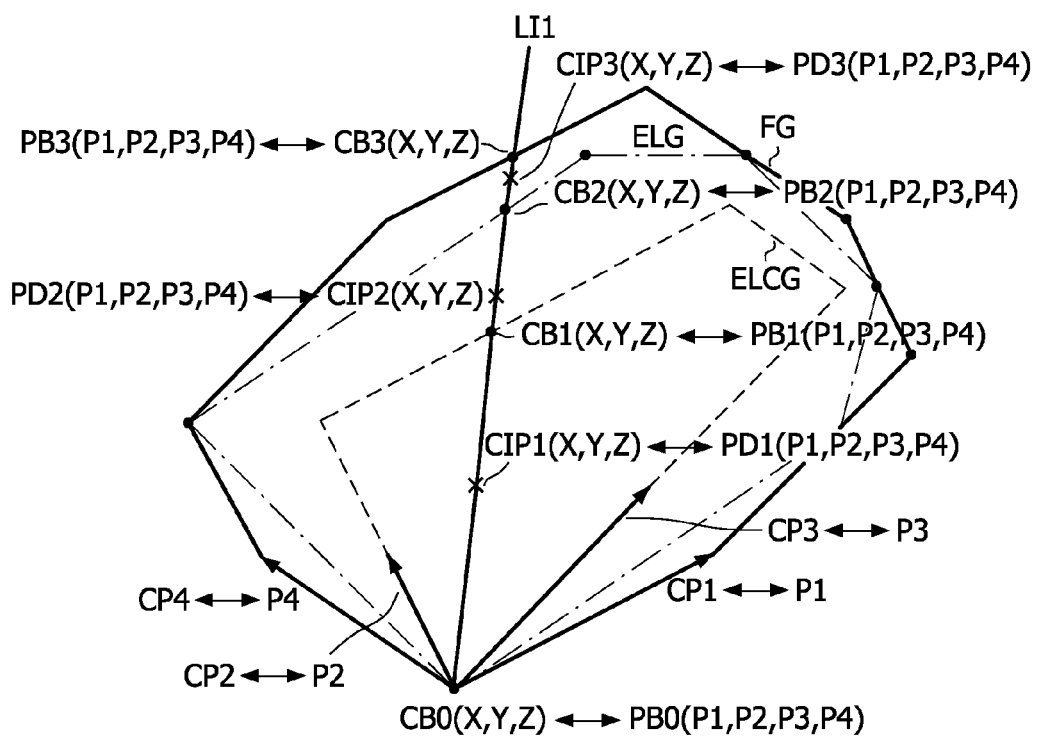
FIG. 6 shows a high level example of how the interpolation factor is determined and how the drive vector is interpolated dependent on the position of the input vector.

FIG. 6 shows a high level example of how the interpolation factor is determined and how the drive vector is interpolated dependent on the position of the input vector. The same primaries CP1 to CP4, and the full gamut FG, the equal luminance gamut ELG, and the equal luminance and equal chromaticity gamut ELCG in the linear color space as in FIG. 5 are shown. To make clear which nomenclature is used for the linear color space, all items in the linear color space are indicated by (X, Y, Z). It has to be noted that this items usually start with a capital letter C. Items which are defined in the display color space are indicated by (P1,P2,P3,P4) and all start with a capital letter P. It has to be noted that the (X, Y, Z) and (P1,P2,P3,P4) are not always used in the now following to keep the reasoning simple, it is anyhow clear from the starting capital which color space is meant. The primaries in the display color space are indicated by P1, P2, P3, P4 directly. Thus, the primaries P1, P2, P3, P4 in the display color space correspond to the primaries CP1, CP2, CP3, CP4, respectively, in the linear color space. The origin O (see FIG. 5) is now indicated by the boundary vector CBO(X, Y, Z) in the linear color space which corresponds to the boundary vector PBO(P1,P2,P3,P4) in the display color space.

The line LI1 is added to elucidate the interpolation mechanism for a linear interpolation. The line LI1 intersects the origin O, the boundary vector CB1(X, Y, Z) corresponding to the boundary vector PB1(P1,P2,P3,P4) of the equal luminance and equal chromaticity gamut ELCG, the boundary vector CB2(X, Y, Z) corresponding to the boundary vector PB2(P1,P2,P3,P4) of the equal luminance gamut ELG, and the boundary vector CB3(X, Y, Z) corresponding to the boundary vector PB(P1,P2,P3,P4) of the full gamut FG.

If an input vector CIP1(X, Y, Z) occurs inside the equal luminance and equal chromaticity gamut ELCG the interpolation factor u is determined from the position of this input vector with respect to the boundary vectors CB1 and CBO. Consequently, the corresponding field drive vector PD1(P1, P2,P3,P4) is determined by interpolating the vectors PBO and PB1 using the interpolation factor u.

If an input vector CIP2(X, Y, Z) occurs outside the equal luminance and equal chromaticity gamut ELCG but inside the equal luminance gamut ELG, the interpolation factor u is determined from the position of this input vector with respect to the boundary vectors CB2 and CB1. Consequently, the corresponding field drive vector PD2(P1,P2,P3,P4) is determined by interpolating the vectors PB2 and PB1 using the interpolation factor u.

If an input vector CIP2(X, Y, Z) occurs outside equal luminance gamut ELG, the interpolation factor u is determined from the position of this input vector with respect to the boundary vectors CB3 and CB2. Consequently, the corresponding field drive vector PP3(P1,P2,P3,P4) is determined by interpolating the vectors PB3 and PB2 using the interpolation factor u.

The vectors PD1 to PD3 are the total vectors of one field which comprises the sub-fields SF1 and SF2. The vectors in the sub-fields SF1, SF2 required to obtain the vectors PD1 to PD3 are elucidated with respect to the example shown in FIG. 7.

Figure 7:
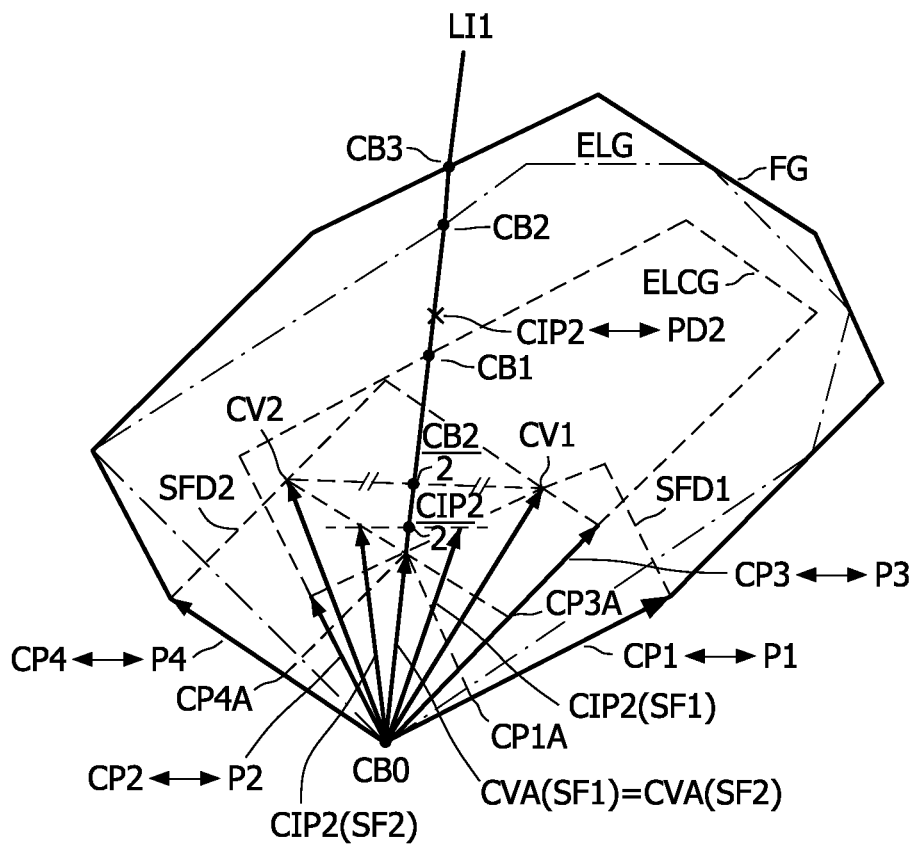
FIG. 7 shows a detailed example of how the interpolation factor, and how the drive vectors for driving the display primaries in the two sub-fields of the multi-primary conversion defined with respect to FIG. 4 are determined.

FIG. 7 shows a detailed example of how the interpolation factor, and how the drive vectors for driving the display primaries in the two sub-fields of the multi-primary conversion defined with respect to FIG. 4 are determined. The primaries CP1 to CP4, the full gamut FG, the equal luminance gamut ELG, the equal luminance and equal chromaticity gamut ELCG, the input vector CIP2 and the border vectors CB1, CB2, CB3 on the same line LI1, all in the linear color space are identical to the corresponding items in FIG. 6.

In the linear color space, the interpolation factor u is determined from the position of the input vector CIP2 with respect to the border vectors CB1 and CB2. The border vectors CB1 and CB2 are selected because the input vector CIP2 is in-between these border vectors CB1 and CB2. If a linear interpolation is applied, the relation between these items is defined by:

$$CIP2 = u*CB1 + (1-u)*CB2.$$

And thus:

$$u = \frac{|CIP2 - CB2|}{|CB1 - CB2|}.$$

It has to be noted that CIP2, CB1 and CB2 are vectors and thus the subtractions are vector subtractions. The interpolation factor is the ratio of the length of the vector subtractions.

In the display color space, the field drive vector PD2 may be determined by using the same linear interpolation:

$$PD2 = u*PB1 + (1-u)*PB2$$

wherein the boundary vectors PB1 and PB2 in the display color space correspond to the boundary vectors CB1 and CB2 in the linear color space. Because u is already determined in the linear color space, and PB1 and PB2 are known because the transformation between the linear color space and the display color space is known, this equation directly provides the correct value for the field drive value PD2. However, this field drive value PD2 cannot be generated in one field but should be constructed as the result of the addition of the drive values in the sub-fields SF1, SF2. Consequently, the interpolation may be performed per sub-field SF1, SF2.

The boundary vector CB1 in the linear color space is composed of the vector CVA=CP2+CP1A during the sub-field SF1 and the vector CVA=CP3A+CP4A in the sub-field SF2. In both sub-fields SF1 and SF2 the same vector CVA is used because the boundary vector CB1 lies on the boundary of the equal luminance and equal chromaticity gamut ELCG.

The boundary vector CB2 in the linear color space lies on the boundary of the equal luminance gamut ELG and thus has to be composed out of two vectors CV1 and CV2 in the respective sub-fields SF1 and SF2 which have the same luminance CB2/2 of half the luminance of the boundary vector CB2, but which have different chromaticities. The vector CV1 is assembled out of the primaries CP1 and CP2, and the vector CV2 is assembled out of the primaries CP3 and CP4.

The part of the boundary vector PB1 in the display color space in the sub-field SF1 is found by transforming the vector CVA(CP1, CP2) in the sub-field SF1 to a vector VA(P1, P2) (not shown) in the display color space. The part of the boundary vector PB2 in the display color space in the sub-field SF1 is found by transforming the vector CV1(CP1, CP2) in the sub-field SF1 to a vector V1(P1, P2) (not shown) in the display color space. Consequently, the interpolated drive value PD2(SF1) (not shown) for the sub-field SF1 is defined by:

$$PD2(SF1)=PD2(P1,P2)=u*VA(P1,P2)+(1-u)*V1(P1,P2).$$

Although not present in reality, the corresponding vector in the linear color space is indicated by:

$$CIP2(SF1)=CIP2(CP1,CP2)=u*CVA+(1-u)*CV1.$$

Thus, the vector CIP2(SF1) ends on the line connecting the end points of the vectors CVA and CV1.

The part of the boundary vector PB1 in the display color space in the sub-field SF2 is found by transforming the vector CVA(CP3, CP4) in the sub-field SF1 to the vector VA(P3, P4) (not shown) in the display color space. The part of the boundary vector PB2 in the display color space in the sub-field SF2 is found by transforming the vector CV2(CP3, CP4) in the sub-field SF2 to the vector V2(P3, P4) (not shown) in the display color space. Consequently, the interpolated drive value PD2(SF2) for the sub-field SF2 is defined by:

$$PD2(SF2)=PD2(P3,P4)=u*VA(P3,P4)+(1-u)*V2(P3,P4).$$

Although not present in reality, the corresponding vector in the linear color space is indicated by:

$$CIP2(SF2)=CIP2(CP3,CP3)=u*CVA+(1-u)*CV2.$$

Thus, the vector CIP2(SF2) ends on the line connecting the end points of the vectors CVA and CV2.

Figure 8:
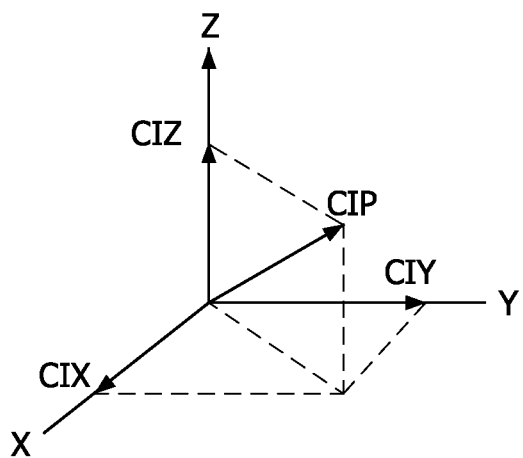
FIG. 8 shows a linear XYZ color space.

FIG. 8 shows a linear CIE-XYZ color space. The linear color space is defined by a Cartesian coordinate system with the axes X, Y and Z, wherein Y is the luminance. Consequently, an input vector CIP is composed of the contributions CIX, CIY, CIZ along the axes X, Y, Z, respectively.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A multi-primary conversion method for converting an input vector (CIP) defining a color of an input pixel in a linear color space (X, Y, Z) into a drive vector (PD) of a display color space having n components for driving n display primaries (P1, . . . , Pn), the drive vector (PD) comprises m sub-drive vectors (PDi) for driving m groups of the display primaries (P1, . . . , Pn), the conversion method comprising:
    receiving the input vector (CIP) defining a color of an input pixel in a linear color spece at a processor input;
    determining by the processor in the linear color space (X, Y, Z) a position of the input vector (CIP) with respect to boundaries (CB) of each of three gamuts (FG, ELG, ELCG) being defined by transformed display primaries (CP1, . . . , CPn),
    wherein the three gamuts (FG, ELG, ELCG) indicate: a full gamut (FG) comprising all colors being reproducible with the m groups of the sub-drive vectors (PDi), an equal luminance sub-gamut (ELG) comprising all colors having equal luminance and being reproducible with each one of the m groups of the sub-drive vectors (PDi), and an equal luminance and equal chrominance sub-gamut (ELCG) comprising all colors being reproducible with each one of the m groups of sub-drive vectors (PDi) each having equal luminance and equal chrominance;
    selecting by the processor three boundary vectors (CB1, CB2, CB3) on the corresponding boundaries (CB) of the three gamuts (FG, ELG, ELCG) to enable the input vector (CIP) to be interpolated from the three boundary vectors (CB1, CB2, CB3),
    determining by the processor an interpolation factor (u) from the position of the input vector (CIP) with respect to the three boundary vectors (CB1, CB2, CB3), and
    interpolating by the processor in the display color space the drive vector (PD) representing the color of the input vector (CIP) in the display color space corresponding to the three boundary vectors (CB1, CB2, CB3) in the linear color space from the interpolation factor (u) and three boundary vectors (PB1, PB2, PB3).

2. A multi-primary conversion method as claimed in claim 1, wherein the determining in the linear color space (X, Y, Z) a position of the input vector (CIP) with respect to the boundaries (CB) of the three gamuts (FG, ELG, ELCG) comprises:
    either, transforming the display primaries (P1, . . . , Pn) in the display color space (R, G, B) to the linear color space (X, Y, Z) to obtain the transformed display primaries (CP1, . . . , CPn), or using the transformed display primaries (CP1, . . . , CPn) if already present, and
    constructing the boundaries (CB) of the full gamut (FG), the equal luminance sub-gamut (ELG) and the equal luminance and equal chrominance sub-gamut (ELCG) from the transformed display primaries (CP1, . . . , CPn), and wherein the interpolating in the display color space the drive vector (PD) comprises transforming the three boundary vectors (CB1, CB2 CB3) in the linear color space (X, Y, Z) to the three boundary vectors (PB1, PB2, PB3) in the display color space.

3. A multi-primary conversion method as claimed in claim 1, wherein the determining in the linear color space (X, Y, Z) a position of the input vector (CIP) with respect to the boundaries (CB) of the three gamuts (FG, ELG, ELCG) comprises retrieving from a pre-stored table for the input vector (CIP) three display boundary vectors (PB1, PB2, PB3) in the display color space and for the three display gamut boundaries in the display color space, wherein the three display boundary vectors (PB1, PB2, PB3) are selected to allow an interpolation of the input vector (CIP) in the linear color space (X, Y, Z), and wherein the three display gamut boundaries in the display color space correspond to the boundaries (CB) of the three gamuts (FG, ELG, ELCG) in the linear color space (X, Y, Z) used for determining the interpolation factor (u).

4. A multi-primary conversion method as claimed in claim 3, wherein the selecting three boundary vectors (CB1, CB2, CB3) on the boundaries (CB) of the three gamuts (FG, ELG, ELCG) comprises:
transforming the three display boundary vectors (PB1, PB2, PB3) in the display color space into three boundary vectors (CB1, CB2, CB3) in the linear color space (X, Y, Z),
calculating at least three boundary luminances (CBY1, CBY2, CBY3) of the three boundary vectors (CB1, CB2, CB3) in the linear color space (X, Y, Z),
comparing the boundary luminances (CBY1, CBY2, CBY3) with an input luminance (CIPY) of the input vector (CIP), and
selecting the three boundary vectors (CB1, CB2, CB3) in the linear color space (X, Y, Z) having the boundary luminances (CBY1, CBY2, CBY3) nearest to the input luminance (CIPY), and wherein the determining the interpolation factor (u) is performed from the position of the input vector (CIP) with respect to the three boundary vectors (CB1, CB2, CB3).

5. A multi-primary conversion method as claimed in claim 1, wherein for an input vector (CIP) within the equal luminance and equal chrominance sub-gamut (ELCG), the three boundary vectors (CB1, CB2, CB3) are selected on the boundary of the equal luminance and equal chrominance sub-gamut (ELCG).

6. A multi-primary conversion method as claimed in claim 1, wherein for an input vector (CIP) within the equal luminance sub-gamut (ELG) but outside the equal luminance and equal chrominance sub-gamut (ELCG), one of the three boundary vectors (CB1) is selected on the boundary of the equal luminance sub-gamut (ELG) and one of the three boundary vectors (CB2) is selected on the boundary of the equal luminance and equal chrominance sub-gamut (ELCG).

7. A multi-primary conversion method as claimed in claim 1, wherein for an input vector (CIP) outside the equal luminance sub-gamut (ELG) and outside the equal luminance and equal chrominance sub-gamut (ELCG), one of the three boundary vectors (CB3) is selected on the boundary of the full gamut (FG) and one of the three boundary vectors (CB2) is selected on the boundary of the equal luminance sub-gamut (ELG).

8. A multi-primary conversion method as claimed in claim 1, wherein the converting (CON) the input vector (CIP) into the drive vector (PD) comprises:
generating m sub-frames (SF1, ..., SFm) of a frame (F), and
allocating each one of the m groups of display primaries (P1, ..., Pn) to a corresponding one of the m sub-frames (SF1, ..., SFm), wherein display primaries of the m groups of display primaries correspond with sub-pixels of a pixel of the display device.

9. A multi-primary conversion method as claimed in claim 1, wherein the interpolating is a linear interpolating.

10. A multi-primary conversion system for converting (CON) an input vector (CIP) defining a color of an input pixel in a linear color space (X, Y, Z) into a drive vector (PD) having n components for driving n display primaries (P1, ..., Pn) of a display color space, the drive vector (PD) comprises m sub-drive vectors (PDi) for driving m groups of the display primaries (P1, ..., Pn), the conversion system comprises a suitably programmed computer operative to:
determine in the linear color space (X, Y, Z) a position of the input vector (CIP) with respect to boundaries (CB) of three gamuts (FG, ELG, ELCG) being defined by transformed display primaries (CP1, ..., CPn), wherein the three gamuts (FG, ELG, ELCG) indicate: a full gamut (FG) comprising all colors being reproducible with the m groups of the sub-drive vectors (PDi), an equal luminance sub-gamut (ELG) comprising all colors having equal luminance and being reproducible with each one of the m groups of the sub-drive vectors (PDi), and an equal luminance and equal chrominance sub-gamut (ELCG) comprising all colors being reproducible with each one of the m groups of sub-drive vectors (PDi) each having equal luminance and equal chrominance;
select three boundary vectors (CB1, CB2, CB3) on the boundaries (CB) of the three gamuts (FG, ELG, ELCG) to enable the input vector (CIP) to be interpolated from the three boundary vectors (CB1, CB2, CB3),
determine an interpolation factor (u) from the position of the input vector (CIP) with respect to the three boundary vectors (CB1, CB2, CB3), and
interpolate in the display color space the drive vector (PD) representing the color of the input vector (CIP) from the interpolation factor (u) and three boundary vectors (PB1, PB2, PB3) in the display color space corresponding to the three boundary vectors (CB1, CB2, CB3) in the linear color space.

11. A display apparatus comprising the multi-primary conversion system as claimed in claim 10, a display device having n sub-pixels per pixel, and a display including a driver for receiving the drive vector (PD) to supply display drive signals PDR to the n sub-pixels.

12. A non-transitory computer storage medium comprising program code for performing the conversion method of claim 1 when said program code is executed on a computer, wherein said conversion method comprises converting (CON) an input vector (CIP) defining a color of an input pixel in a linear color space (X, Y, Z) into a drive vector (PD) having n components for driving n display primaries (P1, ..., Pn) of a display color space, the drive vector (PD) comprises m sub-drive vectors (PDi) for driving m groups of the display primaries (P1, ..., Pn), said program code being operative to:
determine in the linear color space (X, Y, Z) a position of the input vector (CIP) with respect to boundaries (CB) of three gamuts (FG, ELG, ELCG) being defined by transformed display primaries (CP1, ..., CPn), wherein the three gamuts (FG, ELG, ELCG) indicate: a full gamut (FG) comprising all colors being reproducible with the m groups of the sub-drive vectors (PDi), an equal luminance sub-gamut (ELG) comprising all colors having equal luminance and being reproducible with each one of the m groups of the sub-drive vectors (PDi), and an equal luminance and equal chrominance sub-gamut (ELCG) comprising all colors being reproducible with each one of the m groups of sub-drive vectors (PDi) each having equal luminance and equal chrominance;

select three boundary vectors (CB1, CB2, CB3) on the boundaries (CB) of the three gamuts (FG, ELG, ELCG) to enable the input vector (CIP) to be interpolated from the three boundary vectors (CB1, CB2, CB3), determine an interpolation factor (u) from the position of the input vector (CIP) with respect to the three boundary vectors (CB1, CB2, CB3), and interpolate in the display color space the drive vector (PD) representing the color of the input vector (CIP) from the interpolation factor (u) and three boundary vectors (PB1, PB2, PB3) in the display color space corresponding to the three boundary vectors (CB1, CB2, CB3) in the linear color space.

* * * * *